US010070177B1

(12) United States Patent
Gupta

(10) Patent No.: US 10,070,177 B1
(45) Date of Patent: Sep. 4, 2018

(54) AUTOMATED METHODS FOR DETERMINING A USER'S LIKELY EXPOSURE TO MEDIA CONTENT BEING OUTPUT BY A MEDIA DEVICE BASED ON USER INTERACTIONS WITH A MOBILE DEVICE THAT MONITORS MEDIA CONTENT OUTPUTTED BY THE MEDIA DEVICE

(71) Applicant: Alphonso Inc., Mountain View, CA (US)

(72) Inventor: Manish Gupta, Bangalore (IN)

(73) Assignee: Alphonso Inc., Mountain View, CA (US)

( * ) Notice: Subject to any disclaimer, the term of this patent is extended or adjusted under 35 U.S.C. 154(b) by 0 days.

(21) Appl. No.: 15/938,912

(22) Filed: Mar. 28, 2018

(51) Int. Cl.
H04H 60/32 (2008.01)
H04N 21/442 (2011.01)
H04M 3/22 (2006.01)
H04M 1/725 (2006.01)
H04W 24/08 (2009.01)
G06Q 30/02 (2012.01)

(52) U.S. Cl.
CPC .. *H04N 21/44204* (2013.01); *H04M 1/72597* (2013.01); *H04M 3/2218* (2013.01); *H04W 24/08* (2013.01); *G06Q 30/0246* (2013.01)

(58) Field of Classification Search
CPC ....... H04N 21/44204; G06F 17/30843; H04M 1/72597; H04M 3/2218; H04W 24/08; G06Q 30/0246
See application file for complete search history.

(56) References Cited

U.S. PATENT DOCUMENTS

| 9,641,980 | B2 | 5/2017 | Kalampoukas et al. |
| 2011/0289114 | A1 | 11/2011 | Yu et al. |
| 2013/0014136 | A1* | 1/2013 | Bhatia ................. H04N 21/252 725/9 |
| 2013/0071090 | A1 | 3/2013 | Berkowitz et al. |
| 2013/0205318 | A1 | 8/2013 | Sinha et al. |
| 2014/0282669 | A1* | 9/2014 | McMillan ........ H04N 21/44213 725/19 |

(Continued)

OTHER PUBLICATIONS

Wikipedia entry for "Automatic Content Recognition." downloaded from web page: https://en.wikipedia.org/w/index.php?title=Automatic_content_recognition&printable=yes, download date: Aug. 11, 2016, 4 pages.

(Continued)

*Primary Examiner* — Mulugeta Mengesha
(74) *Attorney, Agent, or Firm* — Panitch Schwarze Belisario & Nadel LLP

(57) ABSTRACT

Automated methods are provided for determining a user's likely exposure to media content being output by a media device based on user interactions with a mobile device that is monitoring the media content being outputted by the media device. When a user interacts with their mobile device, such as by using telephone functionality on the mobile device, or by interacting with an application on the mobile device, media content being played on a media device that is in proximity of the media device is sensed and detected using automatic content recognition technology. Media impressions are recorded for the detected media impression.

30 Claims, 7 Drawing Sheets

(56) References Cited

U.S. PATENT DOCUMENTS

2015/0281756 A1* 10/2015 Soon-Shiong ..... H04N 21/2668
                                                    725/14
2015/0370814 A1   12/2015 Liodden et al.
2016/0110757 A1*  4/2016 Vermolen .......... G06Q 30/0246
                                                   705/14.45
2017/0228774 A1*  8/2017 Sallas ................ G06Q 30/0255

OTHER PUBLICATIONS

Audible Magic® product brochures: Core Technology & Services Overview, Broadcast Monitoring, and Media Identification, Audible Magic Corporation, Los Gatos, California, downloaded from web pages at http://www.audiblemagic.com, download date: Aug. 11, 2016, 11 pages.

Gracenote Entourage™, Gracenote, Inc., Emeryville, California, downloaded from webpage: http://www.gracenote.com/video/media-recognition-and-insights/, download date: Aug. 24, 2016, 5 pages.

Gracenote Media Recognition/Gracenote Video ACR, downloaded from webpage: http://www.gracenote.com/video/media-recognition/, download date: Feb. 23, 2018, 10 pages.

* cited by examiner

Database table of media impressions

| Content ID of detected media content | Metadata for media impression | Device ID | Date/Time of media impression |
|---|---|---|---|
| ID 4555556 | Toyota Camry commercial | | |
| ID 9993333 | Silicon Valley, Season 1, episode 4 | | |
| ⋮ | ⋮ | | |

AUTOMATED METHODS FOR DETERMINING A USER'S LIKELY EXPOSURE TO MEDIA CONTENT BEING OUTPUT BY A MEDIA DEVICE BASED ON USER INTERACTIONS WITH A MOBILE DEVICE THAT MONITORS MEDIA CONTENT OUTPUTTED BY THE MEDIA DEVICE

BACKGROUND OF THE INVENTION

Measurement of exposure to media content, including program content and advertising, is an extremely important issue for the media industry. Entire businesses such as Nielsen Media Research which produces Nielsen® Ratings are devoted to performing such measurements. The audience size for media content is a primary factor in determining advertising rates. In today's media landscape, individuals can access, and are exposed to, a wide range of programming and advertising messages anytime, anywhere, and from a great variety of sources on an increasing number of different media platforms. This has complicated the measurement of media exposure.

Accordingly, there is a significant need to develop new tools to more accurately measure media exposure, and particularly, media impressions. The present invention fulfills such a need.

SUMMARY OF THE PRESENT INVENTION

Automated methods are provided for determining a user's likely exposure to media content being output by a media device based on user interactions with a mobile device that is monitoring the media content being outputted by the media device. When a user interacts with their mobile device, such as by using telephone functionality on the mobile device, or by interacting with an application on the mobile device, media content being played on a media device that is in proximity of the media device is sensed and detected using automatic content recognition technology. Media impressions are recorded for the detected media impression.

BRIEF DESCRIPTION OF THE DRAWINGS

Preferred embodiments of the present invention will now be described by way of example with reference to the accompanying drawings:

FIG. 7 is a database table for storing data associated with detected media impressions.

DETAILED DESCRIPTION OF THE INVENTION

Figure 1:
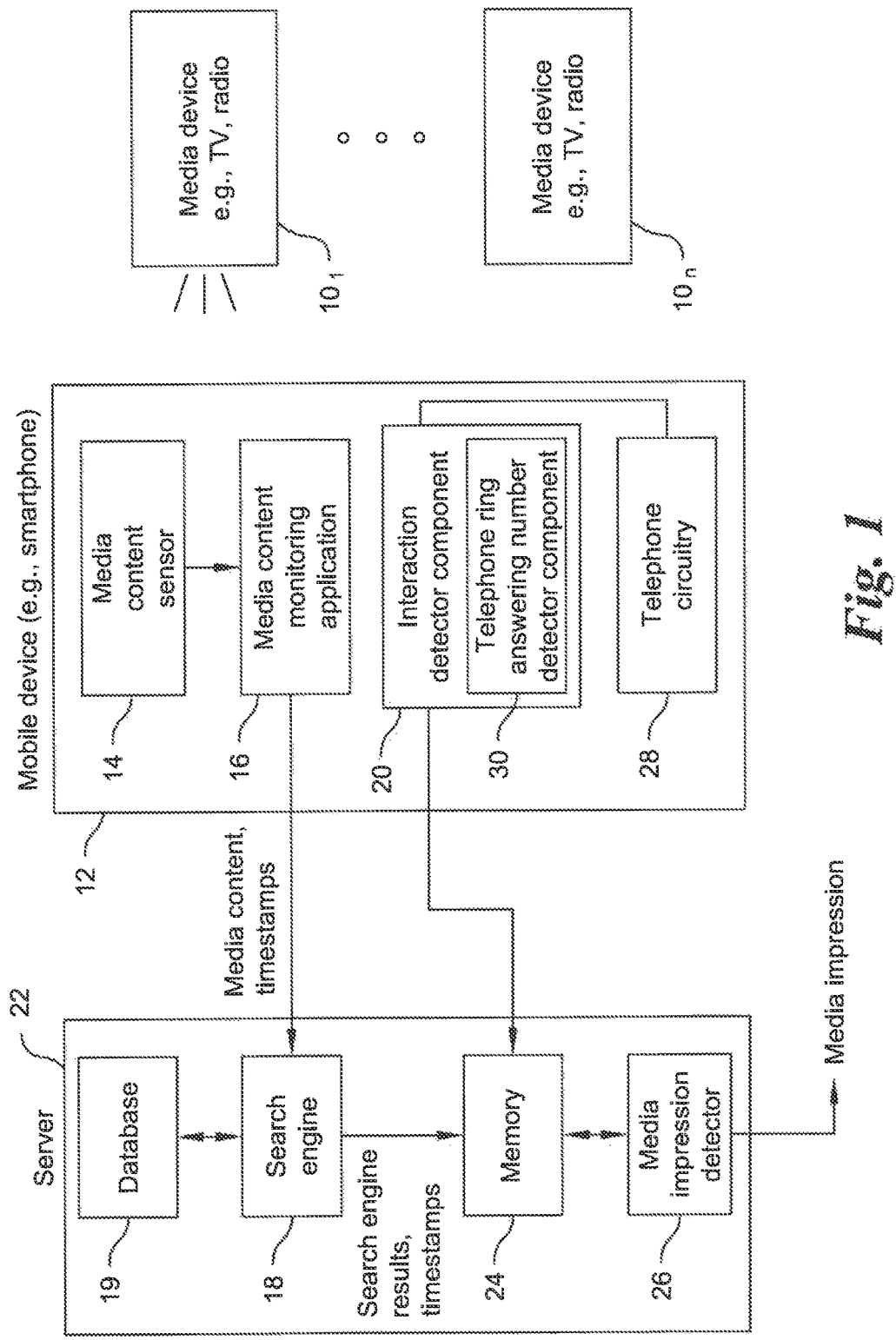
FIG. 1 is a schematic diagram of a system for implementing preferred embodiments of the present invention.

Certain terminology is used herein for convenience only and is not to be taken as a limitation on the present invention.

The words "a" and "an", as used in the claims and in the corresponding portions of the specification, mean "at least one."

I. DEFINITIONS

The following definitions are provided to promote understanding of the present invention.

media content—Media content is the information and experiences that are directed towards an end-user or audience. In the context of the present invention, the media content is delivered via a media device and primarily includes program type content and commercials. The media content may come from (i) a conventional broadcast TV signal, typically delivered over a cable or fiber optic network via a set top box, CableCARD® or the like to a TV, (ii) an over-the-air (OTA) broadcast TV signal, or (iii) streaming services that deliver audio and/or audiovisual content to a device that is connected to a viewer's home network. The media content includes audio or audiovisual content, and thus may be any content in a video data stream or an audio data stream.

media device—A media device is any device that outputs media content, such as a television, radio, or computer.

media content which is playing on a media device in proximity of a mobile device—"Proximity" as used herein means "near in space," and more specifically, near enough in space so that a media content sensor (e.g., a microphone for audio, a camera for video) in or on the mobile device 12 can hear or see the media content with sufficient quality such that the media content can be detected by conventional automated content recognition (ACR) system components.

video data stream (also, referred to interchangeably as a "TV stream" and a "TV channel stream")—A video data stream includes (i) a conventional broadcast TV signal, typically delivered over a cable or fiber optic network via a set top box, CableCARD® or the like to a TV, (ii) an over-the-air (OTA) broadcast TV signal, and (iii) streaming services that deliver video content to a TV device that is connected to a viewer's home network. A video data stream may also be referred to as a "stream of audiovisual data" or an "audiovisual stream" since a video data stream typically includes audio.

audio data stream—An audio data stream includes (i) a conventional broadcast audio signal, such as AM/FM or satellite radio, or (ii) streaming services that deliver audio content to a user's device that is connected to a network.

segment (also, referred to interchangeably as a "content segment")—A segment is a portion of a video data stream or audio data stream that spans a time length. The segment includes the contents of the video data stream or audio data stream within that time length. In one preferred embodiment, the content segments have a time length of about 2 seconds to about 10 seconds, and more preferably, about 4 seconds. However, the time lengths of the content segments may be longer or shorter depending upon the particular implementation and use case.

segment representation—a representation of a segment that can be easily used by a search engine for virtually instantaneous comparison with a stored database of segment representations. In one preferred embodiment, the segment representation is a digital signature of the segment, such as a segment fingerprint. However, other types of segment representations are within the scope of the present invention.

commercial (also, referred to interchangeably as an "advertisement" or "ad")—A "commercial" is an advertisement for a product or service, and also includes advertising for program type content, known in the TV industry as a "promo." A commercial is thus distinguishable from "program type content." An example of "program type content" is a TV show.

media impression—A media impression is a metric of media exposure and is broadly defined as any interaction with a piece of content. The media impression does not need to be confirmed by the recipient (consumer) to count as an impression. That is, the media impression may be "passive,"

wherein the consumer is presumed to be interacting with the piece of content by being in sufficient proximity to the media content (visually and/or audibly) that it is presumed the consumer experienced the media content, and no active action needs to occur to indicate that the media content was seen or heard. The media impressions recorded in the present invention primarily relate to such passive media impressions.

device identifier (device ID)—a device ID is equivalent to a "MAC address" or "physical address" which is unique for every device. The device may be a mobile device. A device ID is typically fixed, but in the case of mobile devices, their device ID's are now user-resettable. A sample device ID (ESN/IMEI/MEID) for an Iphone® 5 is: 990002286593860.

II. DETAILED DISCLOSURE

One preferred embodiment of the present invention, shown schematically in FIG. 1, performs (i) "continuous" user interaction detection with the mobile device 12, (ii) "continuous" sensing by the mobile device 12 for media content, and (iii) "continuous" detection of media content. This embodiment uses "timestamps" of the various detections to determine if a user was likely exposed to the detected media content.

Figure 2:
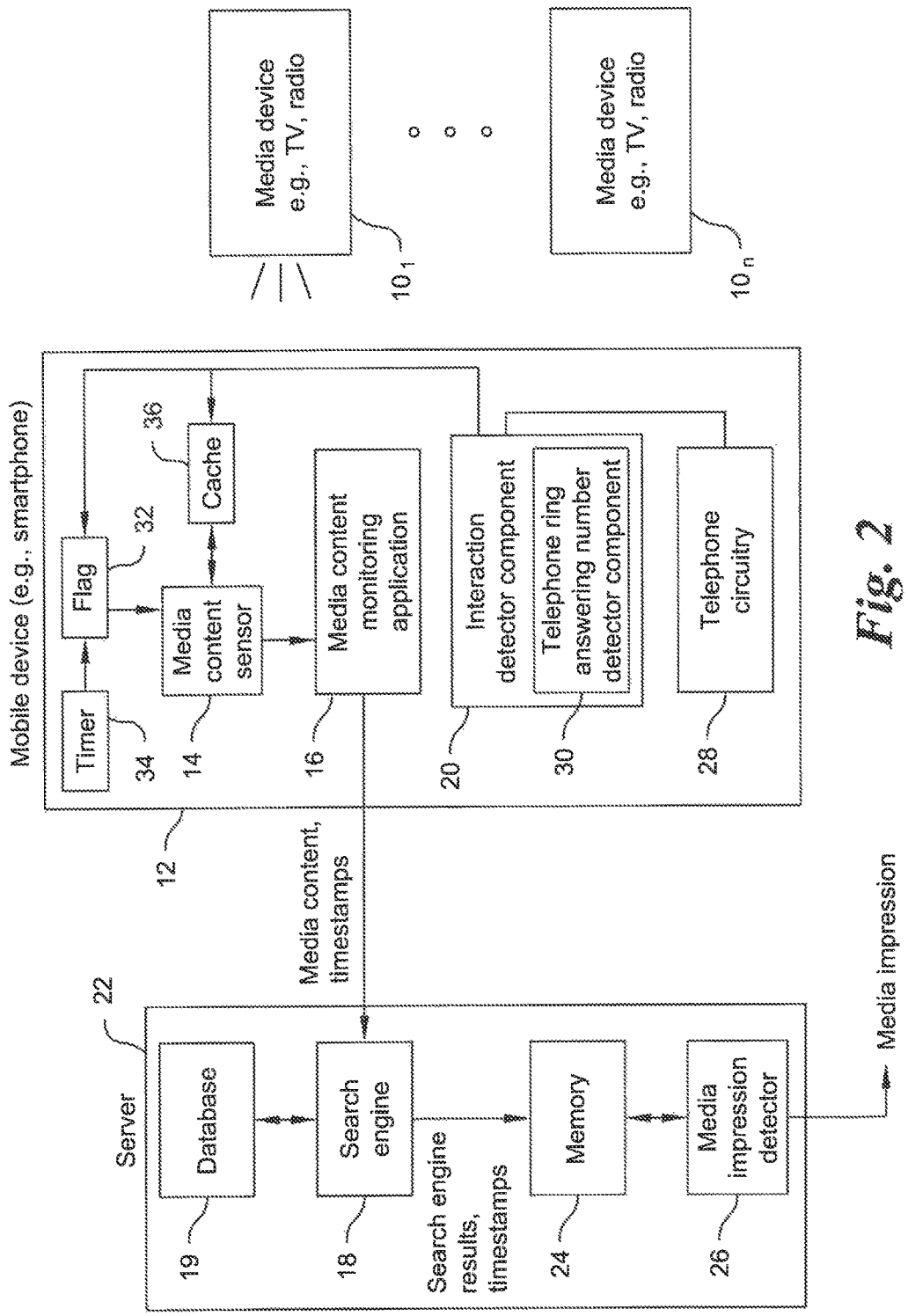
FIG. 2 is a schematic diagram of system for implementing other preferred embodiments of the present invention.

Another preferred embodiment of the present invention, shown schematically in FIG. 2, performs (i) "continuous" user interaction detection with the mobile device 12, (ii) "timer-triggered" sensing by the mobile device 12 for media content, and (iii) "timer-triggered" detection of media content.

The embodiment of FIG. 2 only senses for media content and only performs detection of media content upon user interaction detection, and then only performs the sensing and detection for a limited time period, as determined by the timer setting. Accordingly, this embodiment will typically use substantially less power and computer resources from the mobile device 12 and the server that performs media content recognition than the embodiment of FIG. 1 because the sensing and detection components will not typically be in continuous use, except when there is unusually frequent user interaction throughout the day and night.

The embodiment of FIG. 1 has advantages for certain data analytics customers who may wish to know all of the media content that the mobile device 12 was exposed to, as well as whether the user was likely exposed to that media content.

FIG. 1 shows an overview of one preferred embodiment of the present invention for determining a user's likely exposure to media content being output by media devices $10_1$-$10_n$ (hereafter, referred to as "media device 10") based on user interactions with a mobile device 12 that is monitoring the media content being outputted by the media device 10. The mobile device 12 may be a mobile phone (smartphone), a tablet computer, a laptop computer, a smart watch, or the like.

The mobile device 12 includes a media content sensor 14, a media content monitoring application 16 configured to interact with a search engine 18 that performs automated content recognition (ACR), and an interaction detector component 20. In one preferred embodiment, the search engine 18 is located remotely from the mobile device 12 in a remote server 22 and the media content is electronically communicated to the server 22 for further processing.

In one preferred embodiment, the media content sensor 14 is a microphone configured to receive ambient audio outputted from the media device 10 when the mobile device 12 is in proximity of the media device 10. The media content which is playing on the media device 10 is automatically detected using the media content sensor 14 and the media content monitoring application 16 as follows:

i. Segment representations of the media content are created in the media content monitoring application 16 and electronically communicated to the search engine 18. In one embodiment, the segment representations are segment fingerprints.

ii. The search engine 18 compares the segment representations to known segment representations of media content stored in a database 19 of known media content to detect the media content.

For detecting and processing audio-based media content, search engines that perform this type of recognition are well-known in the art and are incorporated into ACR systems. One type of ACR system having such a search engine uses audio fingerprints within video signals to perform the content recognition. One commercially available audio ACR system is made by Audible Magic Corporation, Los Gatos, Calif. Another commercially available audio ACR system is Gracenote Entourage™ commercially available from Gracenote, Inc., Emeryville, Calif. Other ACR systems are disclosed in U.S. Patent Nos. 2011/0289114 (Yu et al.), 2013/0071090 (Berkowitz et al.), and 2013/0205318 (Sinha et al.), each of which are incorporated by reference herein. Yet another suitable system for performing these functions is described in FIG. 3 of U.S. Pat. No. 9,641,980 (Kalampoukas et al.), which is incorporated by reference herein. Accordingly, the details of an audio ACR process for capturing audio of viewed content is not further described.

In another embodiment, the media content sensor 14 is a camera configured to capture video images from the media device 10 when the mobile device 12 is in proximity of the media device 10. The camera may have fisheye or 360 degree capture technology so that video images may be captured from the media device 10 even if the camera is not directly facing video images on the media device 10.

For detecting and processing image-based media content, search engines that perform this type of recognition are also well-known in the art and are incorporated into video-based ACR systems. Video-based ACR is well-known in the art, and thus is not described in any detail herein. Video-based ACR systems perform image analysis on video frames and create video fingerprints of the video frames, which are then compared to previously stored video fingerprints in a manner similar to audio-based ACR. Any suitable video-based ACR platform may be used for implementing this image embodiment. One example of a commercially available program that can perform video-based ACR includes Gracenote Video ACR software.

"Video" is often used in the context of including both audio and video components. However, for clarity, the video-based ACR and video fingerprints used herein do not contain any audio components.

In either the audio or video embodiments, the segment representations and fingerprints may be created locally in the mobile device 12 and then communicated to the search engine 18 in the server 22, or the audio or video signal itself may be communicated to the search engine 18 in the server 22, and the creation of segment representations and fingerprints may be performed remotely in the server 22. The local creation process requires significantly less bandwidth for the communication between the mobile device 12 and the server 22, but requires additional processing circuitry within the media content monitoring application 16.

Referring again to FIG. 1, user interactions with the mobile device 12 are automatically detected using the interaction detector component 20. A user interaction includes user-initiated invoking of a functionality of the mobile device 12, including touch-based interactions. Thus, any type of physical interaction with the mobile device 12 is flagged as being a user interaction. Typical interactions include making or receiving a phone call, using an app on the mobile device 12 by interacting with a touchscreen of the mobile device 12, or pressing any physical or virtual buttons on the mobile device 12. The present invention uses interaction detection as a proxy for presuming that the user is in the vicinity of their mobile device 12.

Voice-based (verbal) interactions with the mobile device 12, such as speaking into the mobile device 12, may also be detected as a user interaction, but this type of interaction must be distinguished from potential media content detection. One way to do so is to identify trigger words or phrases, such as "Hey, Siri," "Ok Google," or "Alexa" and then record the timestamp when such a word or phrase is spoken as a user interaction, not as potential media content to be compared in the search engine.

In one embodiment wherein the mobile device 12 includes telephone circuitry 28 for making and receiving telephone calls, answering a phone call is always treated as a user interaction, regardless of the number of times that the mobile device 12 rings before the phone call is answered. However, in another preferred embodiment, described further below, user interaction is detected only if the number of rings until the received telephone call is answered is less than a predetermined number rings, such as about one to about three rings. This embodiment presumes that if a user takes a long time to answer a phone call, the user is not likely to be in proximity of the mobile device 12, and thus is not likely being exposed to any media content recently detected by the mobile device 12, whereas if the user answers the phone call quickly, the user is likely to be in proximity of the mobile device 12, and thus was likely exposed to any detected media content that was recently detected by the mobile device 12.

User interaction may also be strictly physical, such as when the user is physically holding the mobile device 12 but not necessarily performing any active interaction with the mobile device 12. This type of interaction may be detected by motion of the mobile device 12 under the presumption that if the mobile device 12 is moving within a room, the user is holding it. A conventional motion sensor within the mobile device 12, such as an accelerometer, may be used for this purpose. This type of interaction may also be detected by touch detection of the case of the mobile device 12, as opposed to the touchscreen of the mobile device, if the mobile device 12 is equipped with such a feature.

A memory 24 in the server 22 stores the following information:

i. Information identifying the media content detected by the server's search engine 18 and database 19 using the process described above.

ii. Timestamps of the detected media content. This is the time that the media content was played by the media device 12, and thus is also the time that the media content is detected by the media content sensor 14. In the case of a live TV stream, the timestamp data may be extracted directly from the video data stream. Alternatively, the timestamp may be added to the data communicated by the media content monitoring application 16 to the server 22. Associating timestamps with a play time of media content is well-known in the art, and thus is not described further.

iii. Timestamps of the user interactions. The interaction detector component 20 includes programming to monitor all activity associated with the mobile device 12, and if any activity is detected, a timestamp is generated. Likewise, if the mobile device 12 is capable of detecting physical activity and if the interaction detector component 20 is programmed to monitor such physical activity, timestamps are generated for such activity. Timestamps that occur very close together (e.g., within 10 seconds of each other) can be combined into a single timestamp to minimize the volume of timestamp data. The granularity of the timestamp data may also depend upon the "predetermined time value," described below.

The server 22 includes a media impression detector 26 which records a user media impression for detected media content only when the timestamp of the detected media content is within a predetermined time value before or after the timestamp of a user interaction. When this condition is met, it is presumed that the user was likely exposed to the media content. In one preferred embodiment, the predetermined time value is about three minutes (180 seconds) to about one hour (3,600 seconds). In an alternative embodiment, only the period of time after the timestamp of the user interaction is checked for detected media content. That is, the window of opportunity for a media impression is not retroactive, and a new time window is started after every detected user interaction which extends for the predetermined time value.

Consider the following scenarios wherein the predetermined time value is 10 minutes (600 seconds) before or after the timestamp of the user interaction (thus, retroactive detection is allowed):

Scenario 1:

The user is in close proximity to a television (media device 10) and is interacting with their mobile device 12 (e.g., making or receiving a phone call, interacting with a mobile app such as Facebook® or Instagram® via the touchscreen of the mobile device 12). The media content sensor 14 and the media content monitoring application 16 of the mobile device 12 work together to constantly listen for ambient audio via the media content sensor 14 and continuously create and send audio fingerprints to the server 22 for identification of media content. The memory 24 records the following timestamps:

12:00:05 pm: A commercial previously stored in the database 19 for Toyota Camry having ID 4555556 is detected.

12:09:01 pm. User interaction with the mobile device 12 is detected.

Result 1:

The media impression detector 26 records a media impression for the commercial, and attributes the media impression to the mobile device 12.

Scenario 2:

Same facts as above, except that the user interaction with the mobile device 12 is detected at 11:45:06 and at 12:11:00, instead of at 12:09:01 pm. Neither of these times are within 10 minutes of the detection of the commercial at 12:00:05 pm.

Result 2:

The media impression detector 26 does not record a media impression for the commercial. While it is possible that the user actually did see the commercial, but simply was not actively engaged with the mobile device 12 in the 10 minutes before or after the commercial, the statistical likelihood that the user saw the commercial is lower than if the user actively engaged with the mobile device 12 in a timeframe closer to the airing of the commercial, in accordance with Scenario 1.

Scenario 3:

The user is not in close proximity to a television, but is interacting with their mobile device 12 (e.g., making or receiving a phone call, interacting with a mobile app such as Facebook® or Instagram® via the touchscreen of the mobile device 12) in another part of the user's house where the television cannot be clearly heard. The media content sensor 14 and the media content monitoring application 16 of the mobile device 12 work together to constantly listen for ambient audio via the media content sensor 14 and continuously create and send audio fingerprints to the server 22 for identification of media content.

The memory 24 records the following timestamps:

12:00:02 pm. User interaction with the mobile device 12 is detected.

12:09:01 pm. Another user interaction with the mobile device 12 is detected.

No media content is detected because none of the audio signatures match known media content. Since the user is not in close proximity to the television, none of the generated audio fingerprints match the commercial being aired at around 12:00:00 or any other commercial or program content played within 10 minutes of the recorded user interaction. That is, the ambient sound being captured by the mobile device 12 does not match any previously known media content. If there is no detectable ambient sound near the mobile device 12, no audio signatures will even be generated, leading to the same result.

Result 3:

The media impression detector 26 does not record a media impression for the commercial for the mobile device 12, even though the commercial aired within 10 minutes of the two user interactions.

The media impressions are stored in a database table for subsequent use. FIG. 7 is a high level view of selected fields of the table, including the content ID of the detected media content and selected metadata, which is obtained from the content ID maintained in the database 19, the device ID of the mobile device 12 that sensed the media content, and the date/time that the media content was sensed. The media impressions may be used for any number of purposes, such as content/ad re-targeting, digital ad campaigns, closed-loop analysis, attribution, and the like. The device ID may be linked to a particular person or physical address using a "device graph." Data analytics companies maintain "device graphs" which can bridge between device ID's, IP addresses (which may be captured in the communications between the mobile device 12 and the server 22), physical addresses, and the like. Device graphs are described in U.S. Patent Application Publication No. 2015/0370814 (Liodden et al.) assigned to TAPAD, Inc. Device graphs are well-known in the art and thus are not further described herein.

The value for the predetermined time value is preferably selected based on empirical evidence and research, past data regarding mobile device interactions for a particular user, and acceptable thresholds of probability regarding the likelihood that a media impression has occurred for a particular mobile device user. If a very high probability is desired, and the user has a very high frequency of user interaction with the mobile device 12, then the predetermined time value can be very short, such as 1 minute (60 seconds). If the user does not frequently interact with the mobile device 12, a much longer predetermined time value, such as 10 minutes (600 seconds) may be selected to avoid missing most of the media impressions.

In one preferred embodiment, the media content sensor 14 and the media content monitoring application 16 of the mobile device 12 are incorporated into an software development kit (SDK) that may be downloaded onto the mobile device 12 as a standalone app or embedded into a third-party app installed on the mobile device 12.

In another preferred embodiment of the present invention, also shown in FIG. 1, a user media impression is recorded for detected media content having a timestamp that is within a predetermined time value of the timestamp of a received telephone call when the number of rings until the received telephone call is answered is less than a predetermined number of rings. The media impression indicates that the user was likely exposed to the media content. This embodiment differs from the previous embodiment in that user interaction with the mobile device 12 is determined solely by the telephone ring answering number. This embodiment requires the use of a telephone ring answering number detector component 30 within the interaction detector component 20. It is well-known in the telephony arts to track the number of telephone rings received by a telephone device. For example, the number of rings before a telephone call switches over to voicemail can be set on most telephone systems and telephone answering machines, and thus these systems and devices include well-known circuitry for detecting the number of rings. Accordingly, the technical details of this component are not described in further detail. The telephone ring answering number detector component 30 tracks the number of rings and outputs the number of rings until the telephone call is answered. If the telephone call is not answered after a certain number of rings and either defaults to voicemail or stops ringing if no voicemail is set up, then the total number of rings is recorded.

For this embodiment to work effectively, the mobile device 12 must be allowed to ring for at least about five rings before it either switches to voicemail or stops ringing. Unless the user changes the default setup, most telephone systems provide for at least about five rings before either of these events occur. Accordingly, for this embodiment to work effectively, the user should not change the default setup. The interaction detector component 20 may then be programmed as follows:

i. Call is answered relatively quickly (e.g., about one ring to about three rings). User is presumed to be in proximity of the mobile device 12 when the call is initially received. The time in which the call is initially received is used to create a timestamp. This timestamp is used in the same manner as the timestamp associated with a user interaction in the previous embodiment, namely that a user media impression is recorded for detected media content having a timestamp that is within a predetermined time value of the timestamp of the received telephone call.

ii. Call is not answered quickly, or is not answered at all (e.g., about four or more rings). User is not presumed to be in proximity of the mobile device 12 when the call is initially received. Accordingly, no timestamp is recorded from the interaction detection component 20, and thus no user media impression is recorded for detected media content having a timestamp that is within a predetermined time value of the timestamp of the received telephone call.

Alternatively, the timestamp of the received telephone call is always recorded and sent to the memory 24 for analysis by the media impression detector 26, and if the number of rings is less than a predetermined number of rings and the respective timestamps are within a predetermined value, a media impression is detected, but if the number of rings equals or exceeds the value for the predetermined number of rings, no media impression is detected even if the respective timestamps are within the predetermined value.

In an alternative embodiment, shown in FIG. 2, instead of detecting whether a timestamp of detected media content occurred within a predetermined time value of the timestamp of a user interaction, a counting flag (flag value) is used as follows:

i. If a user interaction with the mobile device 12 is detected, a flag is set to a predetermined value, such as "5," indicating 5 minutes. When the flag is set, it is presumed that the user is in proximity of the mobile device 12, and thus is experiencing any media content that the mobile device 12 is also experiencing.

ii. A timer runs and expires once every minute.

iii. Each time the timer expires, the flag decrements by "1," thereby causing the flag to decrement every minute (i.e., 5, 4, 3, 2, 1, 0).

iii. When media content is detected by the mobile device 12, the flag value is checked. If the flag value is greater than zero, then it is presumed that the user is in proximity of the mobile device 12 and a media impression is recorded for the media content.

If a user continuously engages with the mobile device 12 (e.g., quick back and forth chat activity), the flag will be continuously reset to its predetermined value, and thus the currently playing media content will continue to be sensed and detected until the user becomes dormant again for a period greater than the predetermined value of the flag.

One advantage of this embodiment is that it reduces energy and computation resources compared to the timestamp embodiment of FIG. 1 because no media content sensing or detecting occurs until a user interaction is detected, and then the media content sensing and detecting only occurs for a limited time period.

This implementation only captures media impressions that occur after a user interaction. However, it can easily be expanded to capture media impressions that occur before the user interaction by continuously caching any detected media content, but only for a time period equivalent to the predetermined value of the flag (e.g., 5 minutes in the example above). That is, the cache only holds a fixed amount of detected media content. A circular buffer may be used for this purpose. When or if a user interaction is detected, the media content in the cache, as well as any newly detected media content is used to perform media detection. The time period of the cached media content may be the same or different than the value of the flag that initiates media content detection after a user interaction occurs. Preferably, the values should have the same order of magnitude.

The caching adds to the power and computing requirements because the media content sensor 14 must always be on since there is no way to accurately predict when a user interaction might occur. However, this additional feature does not use as much power and computing as the FIG. 1 embodiment because the cached media contents do not need to be continuously processed for media content detection or communicated to the server 22. No caching needs to occur when the flag has a non-zero value since any media content that would be cached is redundant to media content that is already being analyzed. Once the flag reaches zero, caching is reactivated.

Referring to FIGS. 1 and 2, the embodiment of FIG. 2 is similar to FIG. 1, but differs from FIG. 1 as follows:

i. FIG. 2 includes a flag 32, timer 34 and cache 36 which perform the functions described above. The output of the interaction detector component 20 is used to (i) set the flag 32 and start the timer 34 for collection of media content for a time period equivalent to the predetermined value of the flag 32, and (ii) release the contents of the cache 36 for media content detection if a retroactive time period is used.

ii. The interaction detector component 20 does not send any timestamps to the memory 24 because no timestamp comparison is performed. Instead, any detected media content is presumed to result in a media impression since only the media content being played at or near the time of a user interaction is detected.

In the embodiment of FIG. 2, the ring detection feature is similarly altered from the embodiment of FIG. 1 so that when a telephone call is answered within a predetermined number of rings, detection of media content is initiated, and a user media impression is recorded for all detected media content that occurs until the flag value reaches zero, and any detected media contents in the cache 36 if a retroactive time period is used.

Figure 3:
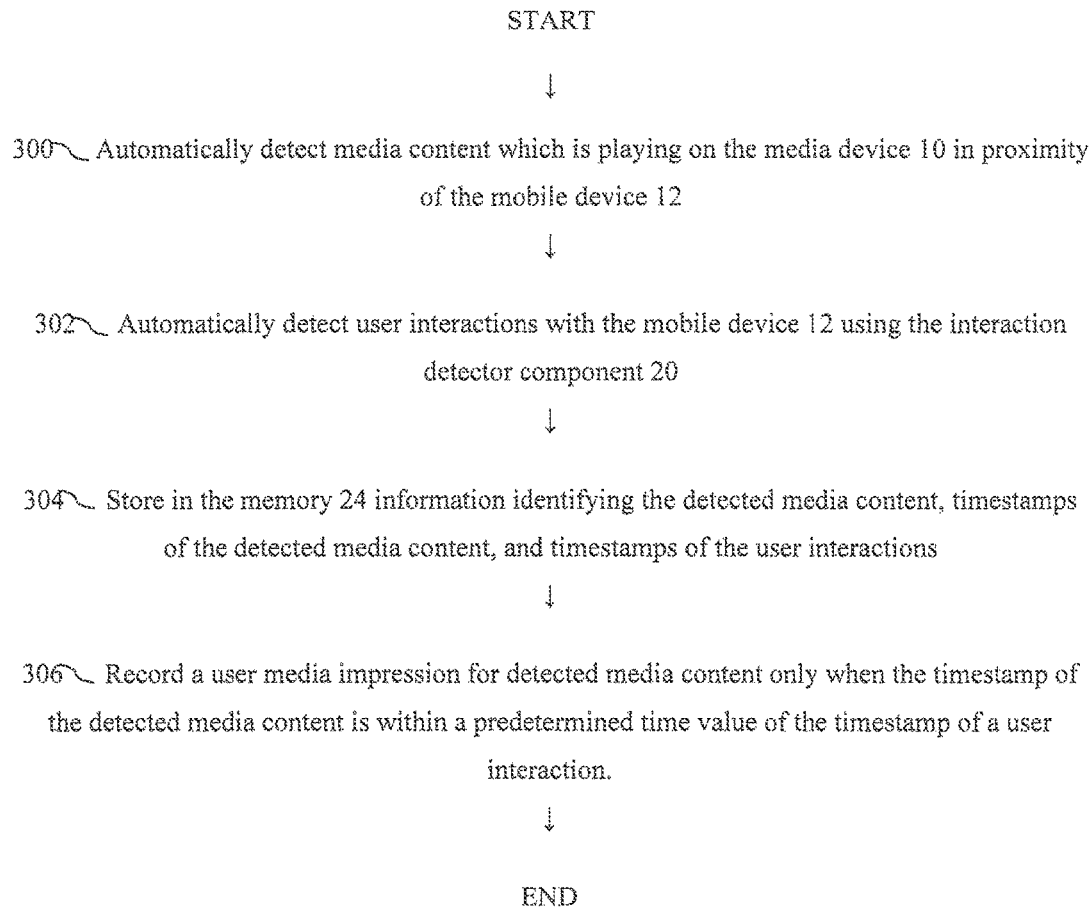
FIGS. 3-6 are flowcharts for implementing the preferred embodiments of FIGS. 1 and 2.

FIG. 3 is a flowchart of one preferred embodiment shown in FIG. 1 and operates as follows:

STEP 300: Automatically detect media content which is playing on the media device 10 in proximity of the mobile device 12.

STEP 302: Automatically detect user interactions with the mobile device 12 using the interaction detector component 20.

STEP 304: Store in the memory 24 information identifying the detected media content, timestamps of the detected media content, and timestamps of the user interactions.

STEP 306: Record a user media impression for detected media content only when the timestamp of the detected media content is within a predetermined time value of the timestamp of a user interaction.

Figure 4:
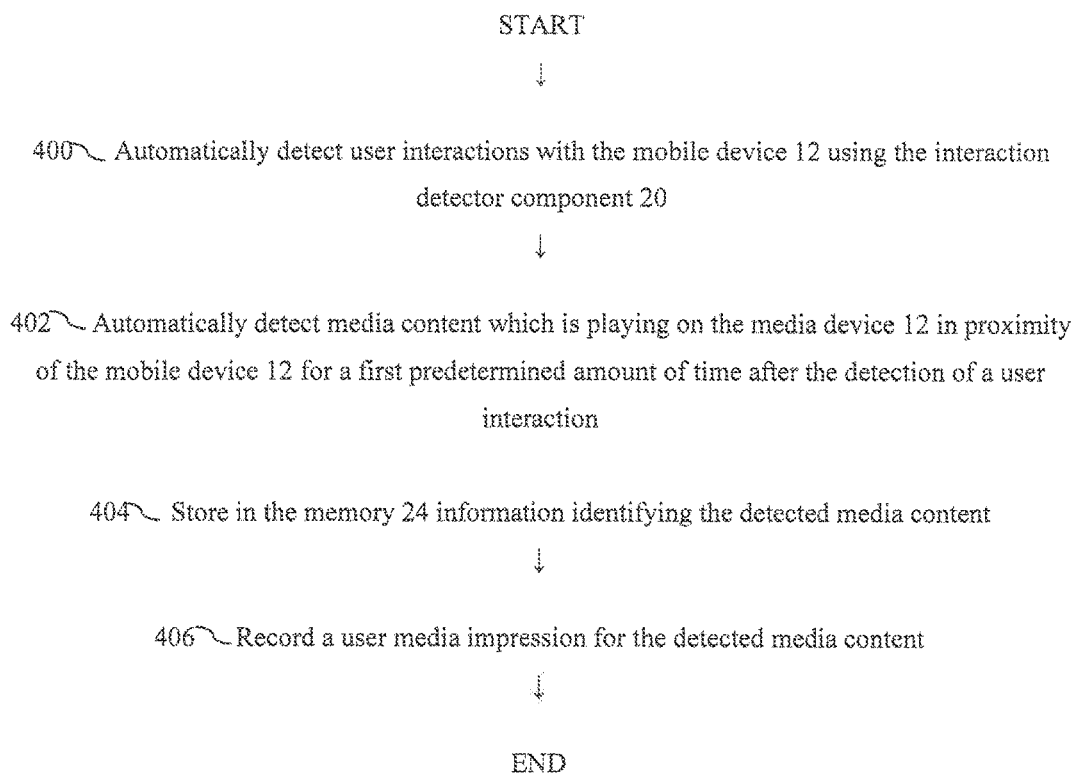

FIG. 4 is a flowchart of one preferred embodiment of FIG. 2 and operates as follows:

STEP 400: Automatically detect user interactions with the mobile device 12 using the interaction detector component 20.

STEP 402: Automatically detect media content which is playing on the media device 12 in proximity of the mobile device 12 for a first predetermined amount of time after the detection of a user interaction.

STEP 404: Store in the memory 24 information identifying the detected media content.

STEP 406: Record a user media impression for the detected media content.

Figure 5:
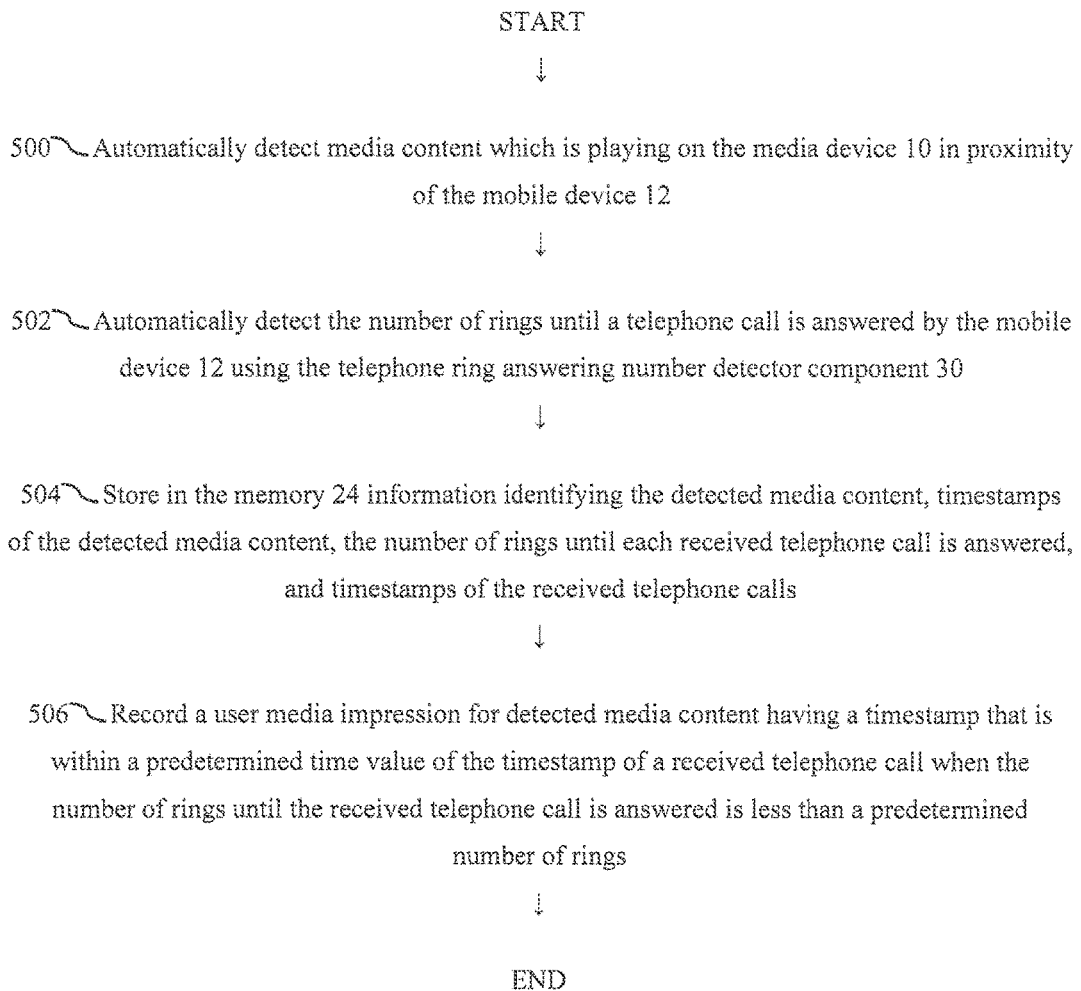

FIG. 5 is a flowchart of another preferred embodiment of FIG. 1 and operates as follows:

STEP 500: Automatically detect media content which is playing on the media device 10 in proximity of the mobile device 12.

STEP 502: Automatically detect the number of rings until a telephone call is answered by the mobile device 12 using the telephone ring answering number detector component 30.

STEP 504: Store in the memory 24 information identifying the detected media content, timestamps of the detected media content, the number of rings until each received telephone call is answered, and timestamps of the received telephone calls.

STEP 506: Record a user media impression for detected media content having a timestamp that is within a predetermined time value of the timestamp of a received telephone call when the number of rings until the received telephone call is answered is less than a predetermined number of rings.

Figure 6:
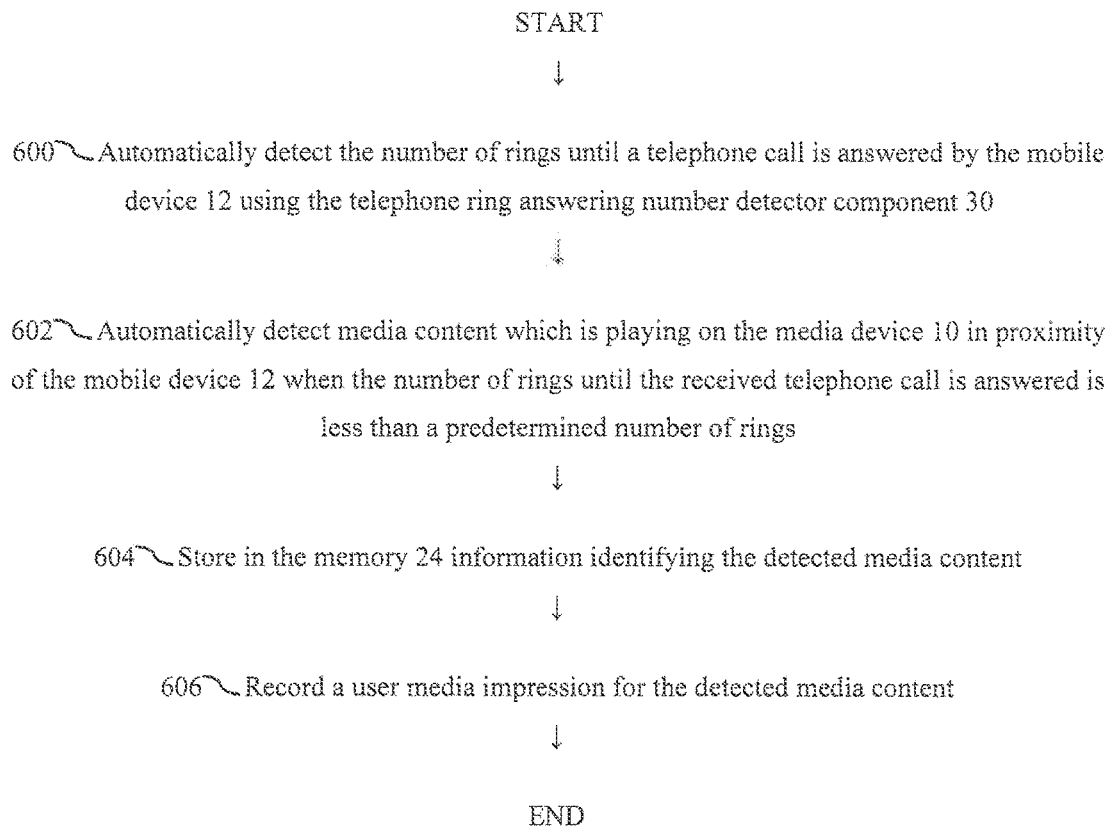

FIG. 6 is a flowchart of another preferred embodiment of FIG. 2 and operates as follows:

STEP 600: Automatically detect the number of rings until a telephone call is answered by the mobile device 12 using the telephone ring answering number detector component 30.

STEP 602: Automatically detect media content which is playing on the media device 10 in proximity of the mobile device 12 when the number of rings until the received telephone call is answered is less than a predetermined number of rings.

STEP 604: Store in the memory 24 information identifying the detected media content.

STEP 606: Record a user media impression for the detected media content.

The present invention may be implemented with any combination of hardware and software. If implemented as a computer-implemented apparatus, the present invention is implemented using means for performing all of the steps and functions described above.

When implemented in software, the software code for the media content monitoring application 16, search engine 18, interaction detector component 20, telephone ring answering number detector component 30 and media impression detector 26 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the search engine 18 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The media content monitoring application 16, search engine 18, interaction detector component 20, telephone ring answering number detector component 30 and media impression detector 26 are not a general-purpose computer devices, but instead are specialized computer machines that perform a myriad of processing functions that are not native to a general-purpose computer, absent the addition of specialized programming.

The media content monitoring application 16 and the interaction detection component in the mobile device 12 may be interconnected with the server 22 by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method for determining a user's likely exposure to media content being output by a media device based on user interactions with a mobile device that is monitoring the media content being outputted by the media device, the mobile device including (i) a media content sensor, (ii) a media content monitoring application configured to interact with a search engine that performs automated content recognition, and (iii) an interaction detector component, the method comprising:

(a) automatically detecting media content which is playing on the media device in proximity of the mobile device using the media content sensor and the media content monitoring application by:
(i) creating segment representations of the media content and electronically communicating the segment representations to the search engine, and
(ii) the search engine comparing the segment representations to known segment representations of media content to detect the media content;
(b) automatically detecting user interactions with the mobile device using the interaction detector component;
(c) storing in a memory:
(i) information identifying the detected media content,
(ii) timestamps of the detected media content, and
(iii) timestamps of the user interactions; and
(d) recording a user media impression for detected media content only when the timestamp of the detected media content is within a predetermined time value of the timestamp of a user interaction, the media impression indicating that the user was likely exposed to the media content.

2. The method of claim 1 wherein the mobile device further includes (iv) telephone circuitry for receiving telephone calls, and (v) a telephone ring answering number detector component, and the interaction detector component is configured to detect when the telephone circuitry answers telephone calls, wherein step (b) includes automatically detecting a user interaction with the mobile device when the number of rings until the received telephone call is answered is less than a predetermined number of rings.

3. The method of claim 2 wherein the predetermined number of rings is about one ring to about three rings.

4. The method of claim 1 wherein the media content sensor is an audio-based detector and the search engine performs audio-based automated content recognition, and wherein step (a)(i) creates segment representations of audio of the media content for comparison by the search engine with known segment representations of audio of media content.

5. The method of claim 1 wherein the segment representations are segment fingerprints.

6. The method of claim 1 wherein the predetermined time value is about 3 minutes to about 60 minutes before or after the timestamp of the user interaction.

7. The method of claim 1 wherein the user interactions with the mobile device include user-initiated invoking of a functionality of the mobile device, including touch-based interactions.

8. The method of claim 1 wherein the media device is a television and the media content is broadcast TV.

9. The method of claim 1 wherein the mobile device is a smartphone.

10. The method of claim 1 wherein the mobile device further includes (iv) telephone circuitry for making and receiving telephone calls, and the interaction detector component is configured to detect when the telephone circuitry makes or answers telephone calls, wherein step (b) includes automatically detecting user interactions with the mobile device when the user makes or answers a telephone call.

11. An automated method for determining a user's likely exposure to media content being output by a media device based on user interactions with a mobile device that is monitoring the media content being outputted by the media device, the mobile device including (i) a media content sensor, (ii) a media content monitoring application configured to interact with a search engine that performs automated content recognition, and (iii) an interaction detector component, the method comprising:
(a) automatically detecting user interactions with the mobile device using the interaction detector component;
(b) automatically detecting media content which is playing on the media device in proximity of the mobile device using the media content sensor and the media content monitoring application for a first predetermined amount of time after the detection of a user interaction in step (a), wherein the automatic detection of the media content occurs by:
(i) creating segment representations of the media content and electronically communicating the segment representations to the search engine, and
(ii) the search engine comparing the segment representations to known segment representations of media content to detect the media content;
(c) storing in a memory information identifying the detected media content; and
(d) recording a user media impression for the detected media content, the media impression indicating that the user was likely exposed to the media content.

12. The method of claim 11 further comprising:
(e) automatically sensing media content which is playing on the media device in proximity of the mobile device using the media content sensor; and
(f) continuously caching in a media cache the most recent sensed media content, wherein the time period of the most recent sensed media content is a second predetermined amount of time backward from the current time,
wherein upon automatically detecting a user interaction with the mobile device using the interaction detector component in step (a), contents of the media cache are further processed using the steps of (b)(i) and (b)(ii), (c) and (d), in the same manner as the media content detected in step (b).

13. The method of claim 11 wherein the first and second predetermined amounts of time have the same magnitude.

14. The method of claim 11 wherein the media content sensor is an audio-based detector and the search engine performs audio-based automated content recognition, and wherein step (b)(i) creates segment representations of audio of the media content for comparison by the search engine with known segment representations of audio of media content.

15. The method of claim 11 wherein the segment representations are segment fingerprints.

16. The method of claim 11 wherein the first predetermined amount of time is about 3 minutes to about 60 minutes.

17. The method of claim 11 wherein the user interactions with the mobile device include user-initiated invoking of a functionality of the mobile device, including touch-based interactions.

18. The method of claim 11 wherein the media device is a television, the media content is broadcast TV, and the mobile device is a smartphone.

19. An automated method for determining a user's likely exposure to media content being output by a media device based on user interactions with telephone functionality of a mobile device that is monitoring the media content being outputted by the media device, the mobile device including (i) a media content sensor, (ii) a media content monitoring application configured to interact with a search engine that performs automated content recognition, (iii) telephone circuitry for receiving telephone calls, and (iv) a telephone ring answering number detector component, the method comprising:
(a) automatically detecting media content which is playing on the media device in proximity of the mobile device using the media content sensor and the media content monitoring application by:
(i) creating segment representations of the media content and electronically communicating the segment representations to the search engine, and
(ii) the search engine comparing the segment representations to known segment representations of media content to detect the media content;
(b) automatically detecting the number of rings until a telephone call is answered by the mobile device using the telephone ring answering number detector component;
(c) storing in a memory:
(i) information identifying the detected media content,
(ii) timestamps of the detected media content,
(iii) the number of rings until each received telephone call is answered, and
(iv) timestamps of the received telephone calls; and
(d) recording a user media impression for detected media content having a timestamp that is within a predetermined time value of the timestamp of a received telephone call when the number of rings until the received telephone call is answered is less than a predetermined number of rings, the media impression indicating that the user was likely exposed to the media content.

20. The method of claim 19 wherein the predetermined number of rings is about one ring to about three rings.

21. The method of claim 19 wherein the media content sensor is an audio-based detector and the search engine performs audio-based automated content recognition, and wherein step (a)(i) creates segment representations of audio of the media content for comparison by the search engine with known segment representations of audio of media content.

22. The method of claim 19 wherein the segment representations are segment fingerprints.

23. The method of claim 19 wherein the media device is a television, the media content is broadcast TV, and the mobile device is a smartphone.

24. An automated method for determining a user's likely exposure to media content being output by a media device based on user interactions with telephone functionality of a mobile device that is monitoring the media content being outputted by the media device, the mobile device including (i) a media content sensor, (ii) a media content monitoring application configured to interact with a search engine that performs automated content recognition, (iii) telephone circuitry for receiving telephone calls, and (iv) a telephone ring answering number detector component, the method comprising:

(a) automatically detecting the number of rings until a telephone call is answered by the mobile device using the telephone ring answering number detector component;
(b) automatically detecting media content which is playing on the media device in proximity of the mobile device using the media content sensor and the media content monitoring application for a first predetermined amount of time when the number of rings until the received telephone call is answered is less than a predetermined number of rings, wherein the automatic detection of media content occurs by:
(i) creating segment representations of the media content and electronically communicating the segment representations to the search engine, and
(ii) the search engine comparing the segment representations to known segment representations of media content to detect the media content;
(c) storing in a memory information identifying the detected media content; and
(d) recording a user media impression for the detected media content, the media impression indicating that the user was likely exposed to the media content.

25. The method of claim 24 further comprising:
(e) automatically sensing media content which is playing on the media device in proximity of the mobile device using the media content sensor; and
(f) continuously caching in a media cache the most recent sensed media content, wherein the time period of the most recent sensed media content is a second predetermined amount of time backward from the current time,
wherein when the number of rings until the received telephone call is answered is less than a predetermined number of rings in step (b), contents of the media cache are further processed using the steps of (b)(i) and (b)(ii), (c) and (d), in the same manner as the media content detected in step (b).

26. The method of claim 24 wherein the first and second predetermined amounts of time have the same magnitude.

27. The method of claim 24 wherein the predetermined number of rings is about one ring to about three rings.

28. The method of claim 24 wherein the media content sensor is an audio-based detector and the search engine performs audio-based automated content recognition, and wherein step (b)(i) creates segment representations of audio of the media content for comparison by the search engine with known segment representations of audio of media content.

29. The method of claim 24 wherein the segment representations are segment fingerprints.

30. The method of claim 24 wherein the media device is a television, the media content is broadcast TV, and the mobile device is a smartphone.

* * * * *